(12) United States Patent
Côté et al.

(10) Patent No.: US 9,715,008 B1
(45) Date of Patent: Jul. 25, 2017

(54) VISUALIZATION OF 3-D GPR DATA IN AUGMENTED REALITY

(71) Applicant: Bentley Systems, Incorporated, Exton, PA (US)

(72) Inventors: Stéphane Côté, Lac Beauport (CA); Renaud Gervais, Amos (CA)

(73) Assignee: Bentley Systems, Incorporated, Exton, PA (US)

( * ) Notice: Subject to any disclaimer, the term of this patent is extended or adjusted under 35 U.S.C. 154(b) by 416 days.

(21) Appl. No.: 13/847,909

(22) Filed: Mar. 20, 2013

(51) Int. Cl.
*G01S 13/89* (2006.01)
*G01S 7/20* (2006.01)
*G01S 13/88* (2006.01)

(52) U.S. Cl.
CPC .............. *G01S 7/20* (2013.01); *G01S 13/885* (2013.01)

(58) Field of Classification Search
CPC .......................................................... G01S 7/20
USPC ............................................ 342/22, 27, 191
See application file for complete search history.

(56) References Cited

U.S. PATENT DOCUMENTS

| | | | | |
|---|---|---|---|---|
| 6,094,625 A * | 7/2000 | Ralston | .................... | G06F 3/011 239/161 |
| 6,445,334 B1* | 9/2002 | Bradley | ..................... | G01S 7/20 342/195 |
| 6,928,384 B2* | 8/2005 | Kochi | .................... | G06T 7/0075 348/E13.008 |
| 7,930,103 B2 | 4/2011 | Young et al. | | |
| 8,356,255 B2* | 1/2013 | Nielsen et al. | ................ | 715/764 |
| 2003/0000115 A1* | 1/2003 | Green | ..................... | E02F 3/435 37/348 |
| 2003/0012411 A1* | 1/2003 | Sjostrom | ................. | G01S 7/046 382/109 |
| 2004/0233222 A1* | 11/2004 | Lee | ........................ | G06F 3/0481 345/621 |
| 2008/0079723 A1* | 4/2008 | Hanson | ................ | G06K 9/0063 345/427 |
| 2010/0205555 A1* | 8/2010 | Nielsen | .................. | G07B 15/00 715/771 |

(Continued)

OTHER PUBLICATIONS

Schall, G.; Mendez, E.; Schmalstieg, D., "Virtual redlining of civil engineering in real environments," Mixed and Augmented Reality, 2008. ISMAR 2008, 7th IEEE/ACM International Symposium on , vol. No. pp. 95,98, Sep. 15-18, 2008.*

(Continued)

*Primary Examiner* — Marcus Windrich
(74) *Attorney, Agent, or Firm* — Cesari and McKenna, LLP; James A. Blanchette

(57) ABSTRACT

In one embodiment, an augmented reality application generates an augmented reality view that displays three-dimensional (3-D) ground penetrating radar (GPR) data on boundary surfaces of a virtual excavation. The augmented reality application calculates an intersection of the one or more boundary surfaces of the virtual excavation and the 3-D GPR data, and extracts data items of the 3-D GPR data that intersect the one or more boundary surfaces of the virtual excavation. The augmented reality application then projects two-dimensional (2-D) images based on the extracted data items onto the one or more boundary surfaces of the virtual excavation to show subsurface features in the augmented reality view that can be manipulated (e.g., moved, rotated, scaled, have its depth changed, etc) by a user.

20 Claims, 8 Drawing Sheets

(56) References Cited

U.S. PATENT DOCUMENTS

| | | | |
|---|---|---|---|
| 2014/0184643 A1* | 7/2014 | Friend | G09G 3/003 345/633 |
| 2014/0188333 A1* | 7/2014 | Friend | E02F 9/261 701/34.4 |

OTHER PUBLICATIONS

Schall, G.; Mendez, E.; Schmalstieg, D., "Virtual redlining for civil engineering in real environments," Mixed and Augmented Reality, 2008. ISMAR 2008. 7th IEEE/ACM International Symposium on, vol. No. pp. 95,98, Sep. 15-18, 2008.*

F. Dai and M. Lu, "Analytical approach to augmenting site photos with 3D as-built bored pile models," Proceedings of the 2009 Winter Simulation Conference (Wsc), Austin, TX, 2009, pp. 2691-2702.*

Avery, Benjamin, et al., "Improving Spatial Perception for Augmented Reality X-Ray Vision," IEEE Virtual Reality, Mar. 14-18, 2009, pp. 1-4.

Daniels, Jeffrey J., "Ground Penetrating Radar Fundamentals," Department of Geological Sciences, The Ohio State University, Nov. 25, 2000, pp. 1-21.

Talmaki, Sanat A., et al., "Geospatial Databases and Augmented Reality Visualization for Improving Safety in Urban Excavation Operations," Proc., Construction Research Congress 2010: innovation for Reshaping Construction Practice. Reston, VA: ASCE, 2010, pp. 1-10.

Schall, Gerhard, et al., "Urban 3D Models: What's underneath? Handheld Augmented Reality for Subsurface Infrastructure Visualization", 9th International Conference on Ubiquitous Computing (UbiComp 2007), Innsbruck, Austria, 2007, pp. 1-4.

Schall, Gerhard, et al., "Handheld Augmented Reality for Underground Infrastructure Visualization," In Personal and Ubiquitous Computing, Special Issue on Mobile Spatial Interaction, Springer, 2008, pp. 1-17.

Schall, Gerhard, et al., "VI DENTE—3D Visualization of Underground Infrastructure Using Handheld Augmented Reality", "Geohydroinformatics—Integrating GIS and Water Engineering" ISBN: 9781420051209 ; to be published by CRC Press/Taylor and Francis# Publisher: CRC; 1 edition (Feb. 15, 2010), 2010., pp. 1-17.

Sgambati, Matthew R., et al. "Immersive Visualization and Interactive Analysis of Ground Penetrating Radar Data," Conference Proceedings, Proceedings of the $7^{th}$ International Symposium on Visual Computing (ISVC 2011), 2011, pp. 1-12.

U.S. Appl. No. 13/364,846, filed Feb. 2, 2012 by Stéphane Côté et al. for Technique for Providing an Initial Pose for a 3-D Mode, pp. 1-35.

* cited by examiner

VISUALIZATION OF 3-D GPR DATA IN AUGMENTED REALITY

BACKGROUND

Technical Field

The present disclosure relates to visualization of three-dimensional (3-D) data and, more specifically, to techniques for visualization of 3-D ground-penetrating radar (GPR) data or other types of subsurface 3-D data.

Background Information

GPR is a technology that uses radar pulses to collect data deceptive of features below the surface of a material (subsurface features). Most often, the material is the ground, however in certain applications, the material may be concrete, steel, or some other material, or combinations of materials, located above ground level. In a typical GPR system, high-frequency radio waves (e.g., in the ultra high frequency (UHF) or very high frequency (VHF) bands) are generated and transmitted into the material. The waves travel through the material, and when they reach a boundary between two regions with different dielectric constants, a portion of the waves is reflected back. The boundaries between dielectric constants typically coincide with boundaries of objects disposed in the material, voids in the material, changes in composition of the material, or other features. The reflected waves are typically detected by an antenna of the GPR system, arranged on the surface. The GPR system measures variations in the reflected waves, and such variations are used to generate GPR data descriptive of subsurface features. While the GPR data may be used for different purposes, it is most often used to produce an image of the subsurface features. Depending on factors such as material type, density, and the presence of certain interfering substances, the quality of GPR data may vary. However, for many exploratory applications, even low quality GPR data is quite useful, as it provides the user with an indication of what lies below the surface prior to disturbing the material (e.g., digging in the ground).

Early GPR systems typically utilized a two-dimensional (2-D) scanning methodology and produced 2-D GPR data. From the 2-D GPR data, a 2-D image could be generated. More recent GPR systems may utilize a 3-D scanning methodology. In one type of 3-D scanning methodology, the GPR system transmits and receives back reflected waves at a series of locations along the surface, to collect GPR data corresponding to a series of 2-D vertical profiles through the material. The GPR data corresponding to the vertical profiles is assembled in order, for example, in a data matrix, to produce a collection of data that describes subsurface features in three dimensions (3-D GPR data). The 3-D GPR data may be used to produce tomographic images. In typical tomographic images, the 3-D GPR data is "sliced" (e.g., horizontally) to create a series of 2-D images that show subsurface features as they appear at various intervals (e.g., depths).

While topographic images produced from 3-D GPR data may be useful in many applications, they suffer shortcomings. The images are generally presented to a user in a purely virtual context, disconnected from the physical world. For example, they may be displayed in isolation in the user interface of a software application on the display screen of a computer. The images are not visually correlated with the physical world. In order to understand size and location of subsurface features that may be shown in the images, the user may have to take measurements in the displayed images, scale them to physical world dimensions, and then attempt to correlate these with landmarks on the surface in the physical world. Often the user may attempt to mark out the features on the surface, for example, with paint, to try and understand them. This process may be time consuming and error prone. If mistakes are made, the benefits of the 3-D GPR data may be lost. The 3-D GPR data, rather than provide an indication of what lies below the surface, may actually mislead the user, causing them to believe something is located where it is not.

SUMMARY

In one embodiment, an augmented reality application generates an augmented reality view that displays 3-D GPR data on boundary surfaces of a virtual excavation. A view of the physical environment (e.g., a planar or panoramic view) is captured by a camera and provided to the augmented reality application. The view of the physical environment may be a static view (e.g., a still image captured at a moment in time) or a dynamic view (e.g., full motion video continually being captured). The augmented reality application anchors a 3-D model corresponding to the physical environment to the view of the physical environment, such that correspondence is defined between portions of (e.g., points in) the 3-D model and portions of (e.g., points in) the view of the physical environment. Due to such correspondence, each portion of (e.g., point in) the view of the physical environment corresponds to a position within 3-D space of the 3-D model, and may be associated with coordinates of a coordinates system for this 3-D space.

Once the 3-D model is anchored, the augmented reality application generates an augmented reality view and displays it in a user-interface. The augmented reality view may be a static view or a dynamic view, depending on the implementation. Elements of the 3-D model may, at least initially, be hidden in the augmented reality view. In response to user input in a user-interface of the augmented reality application, the augmented reality application may create a virtual excavation in the augmented reality view. The virtual excavation operates as a virtual "hole" in material (e.g., in the ground), and may have a bottom boundary surface and side boundary surfaces, while being open to the top. The boundary surfaces may be defined by coordinates in the 3-D space of the 3-D model. In one implementation, the virtual excavation may be rectangular, and thereby have four side boundary surfaces, and a bottom boundary surface, defined by coordinates in the 3-D space of the 3-D model.

The augmented reality application calculates an intersection between the boundary surfaces of the virtual excavation and 3-D GPR data collected from the physical environment. The 3-D GPR data may be indexed according to the same coordinate system as the 3-D model, such that individual data items of the 3-D GPR data correspond to coordinates within the 3-D space of the 3-D model. Data items of the 3-D GPR data whose positions intersect the boundary surfaces of the virtual excavation are extracted to create a number of data sets, each data set corresponding to a respective boundary surface. The augmented reality application then generates 2-D images from the data sets and projects those 2-D images onto the related boundary surfaces of the virtual excavation. The view created generally resembles a physical excavation, where material inside of the excavation has been removed so that features disposed on the sides and bottom of the excavation are visible, but those below the bottom of the excavation, or beyond the sides of the excavation, are still hidden (e.g., still in the ground).

In response to user input in the user interface, the augmented reality application may move, rotate, scale, change a depth of, or otherwise manipulate the virtual excavation. Such changes may involve altering the coordinates that define the boundary surfaces, recalculating the intersection between the boundary surfaces and the 3-D GPR data, re-extracting those data items that intersect to form updated data sets, and projecting new 2-D images generated from these data sets onto the new boundary surfaces. Further, in response to user input in the user interface, elements of the 3-D model may be disco played in the augmented reality view. Certain elements of the 3-D model may be rendered and shown, for example, within the interior of the virtual excavation. These model elements may complement the 2-D images projected onto the boundary surfaces of the virtual excavation, allowing the user to see relationships there between.

It should be understood that a variety of other embodiments may be implemented, including other embodiments discussed below, and variations thereof. This Summary is intended simply as an introduction to the reader, and does not indicate or imply that the techniques mentioned herein are necessary, or essential, to the invention.

BRIEF DESCRIPTION OF THE DRAWINGS

The detailed description below refers to the accompanying drawings of example embodiments, of which.

DETAILED DESCRIPTION

Figure 1:
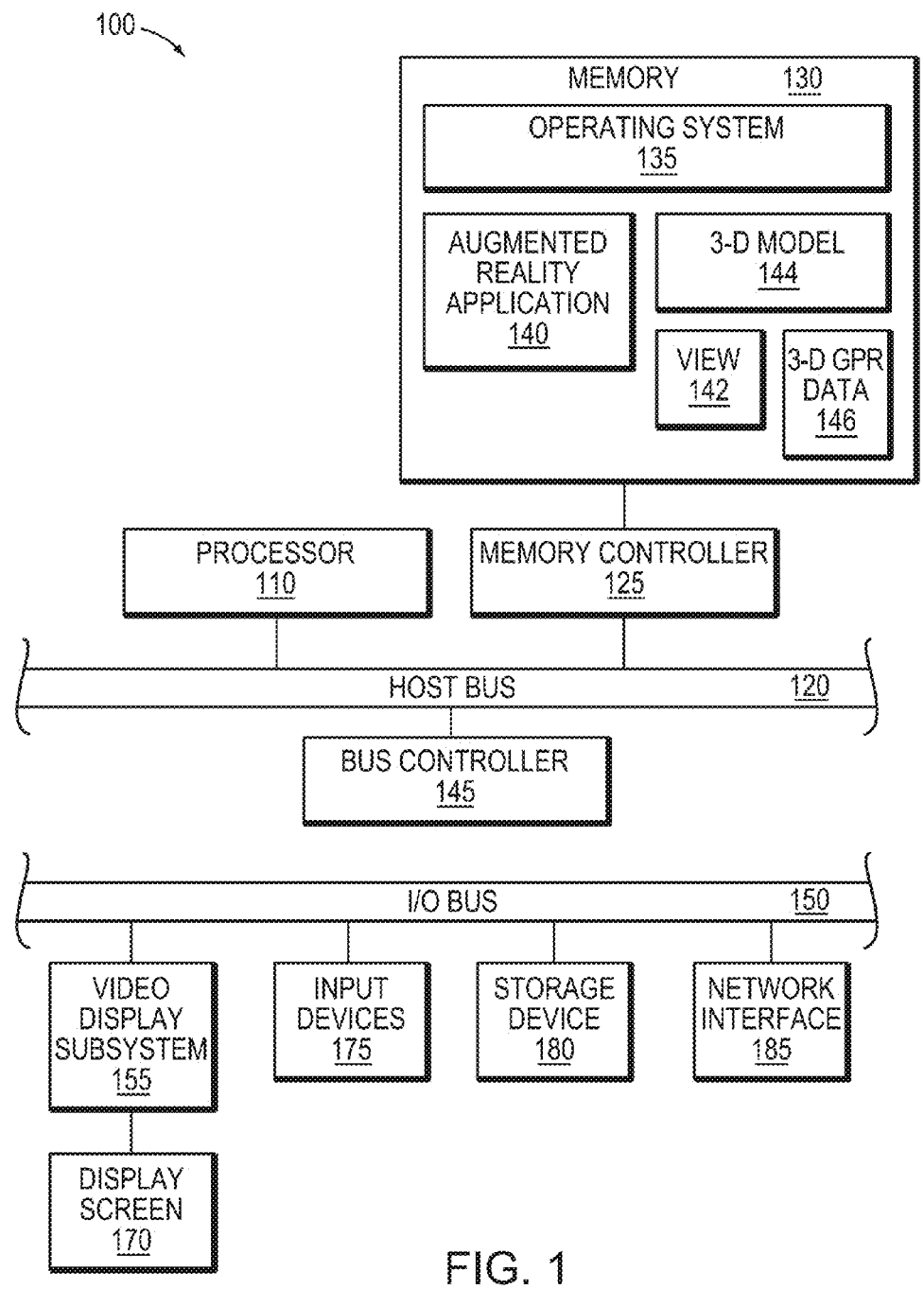
FIG. 1 is a block diagram of an example electronic device, in which at least some of the presently described techniques may be employed.

FIG. 1 is a block diagram of an example electronic device 100, in which at least some of the presently described techniques may be employed. The electronic device may be a portable electronic device, for example, a tablet computer, an ultra-mobile personal computer (UMPC), a smartphone, a wearable computer, for example, with a headmounted display (HMD) (e.g., integrated into eyewear), or another type of mobile computing device that may be readily transported by a user about the physical environment. Alternatively, the electronic device may be a generally-stationary electronic device, for example, a desktop computer or server. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 125. The memory 130 is configured to store at least a portion of computer-executable instructions and data for an operating system 135 while the electronic device 100 is operating. In addition, the memory 130 may store at least portions of an augmented reality application 140 that is capable of creating an augmented reality view in which computer-generated features are overlaid upon a view of the physical environment (e.g., a planar or panoramic view). Through such overlay, the augmented reality view blends the real and the virtual. The augmented reality view may include a virtual excavation upon whose boundary surfaces 3-D GPR data is shown. The virtual excavation may allow a user to understand how the 3-D GPR data relates to what the physical environment.

The view of the physical environment may be captured by a camera (not shown) and stored in as a data structure 142 in the memory 130. The view of the physical environment may be a static view (e.g., a still image) or a dynamic view (e.g., full motion video). To create an augmented reality view from the view of the physical environment, the augmented reality application 140 may utilize a 3-D model 144 that corresponds to the physical environment. The 3-D model 144 includes elements arranged in 3-D space organized according to a coordinate system. In some implementations, the 3-D model 144 may be a computer aided design (CAD) model created and/or maintained by a CAD environment (not shown), for example, the MicroStation® V8i environment.

Further, to create the virtual excavation within the augmented reality view, the augmented reality application 140 may also utilize 3-D GPR data 146 collected by a GPR system and maintained in memory 130. The 3-D GPR data 146 may be arranged in a multi-dimensional data structure, and indexed according to the same coordinate system as the 3-D model 144, such that individual pieces of GPR data correspond to coordinates within the 3-D space of the 3-D model 144.

The host bus 120 of the electronic device 100 is coupled to an input/output (I/O) bus 150 through a bus controller 145. A persistent storage device 180, such as a hard disk drive, a solid-state drive, or another type or persistent data store, is coupled to the I/O bus 150, and may persistently store computer-executable instructions and data, that are available to be loaded to the volatile memory 130 when needed. A video display subsystem 155 that includes a display screen 170 may also be coupled to the I/O bus 150. A user-interface of the reality application 140, which includes an augmented reality view, may be shown on the display screen 170.

One or more input devices 175, such as a touch sensor incorporated into the display screen 170, a touchpad, a keyboard, a mouse, a trackball, etc. may be provided and used for interacting with the augmented reality application 140 and the electronic device 100 in general. Further, the I/O bus 150 may be coupled to a network interface 185 (e.g., a wireless interface or a wired interface) that interfaces with a computer network, for example, the Internet (not shown). The computer network may allow communication between the electronic device 100 and other devices, using any of a number of well known networking protocols. Such communication may enable a variety of collaborative, distributed, and/or remote computing configurations. For example, while the augmented reality application 140, 3-D model 144, and 3-D GPR data 146 are shown resident on the electronic device 100 in FIG. 1, it should be understood that one or more of these entities, or portions thereof, may be remotely located. For instance, the 3-D model 144 and 3-D GPR data 146 may be resident on a remote server and retrieved via the network interface 185 as needed, or some other entity may be remotely located.

Figure 2:
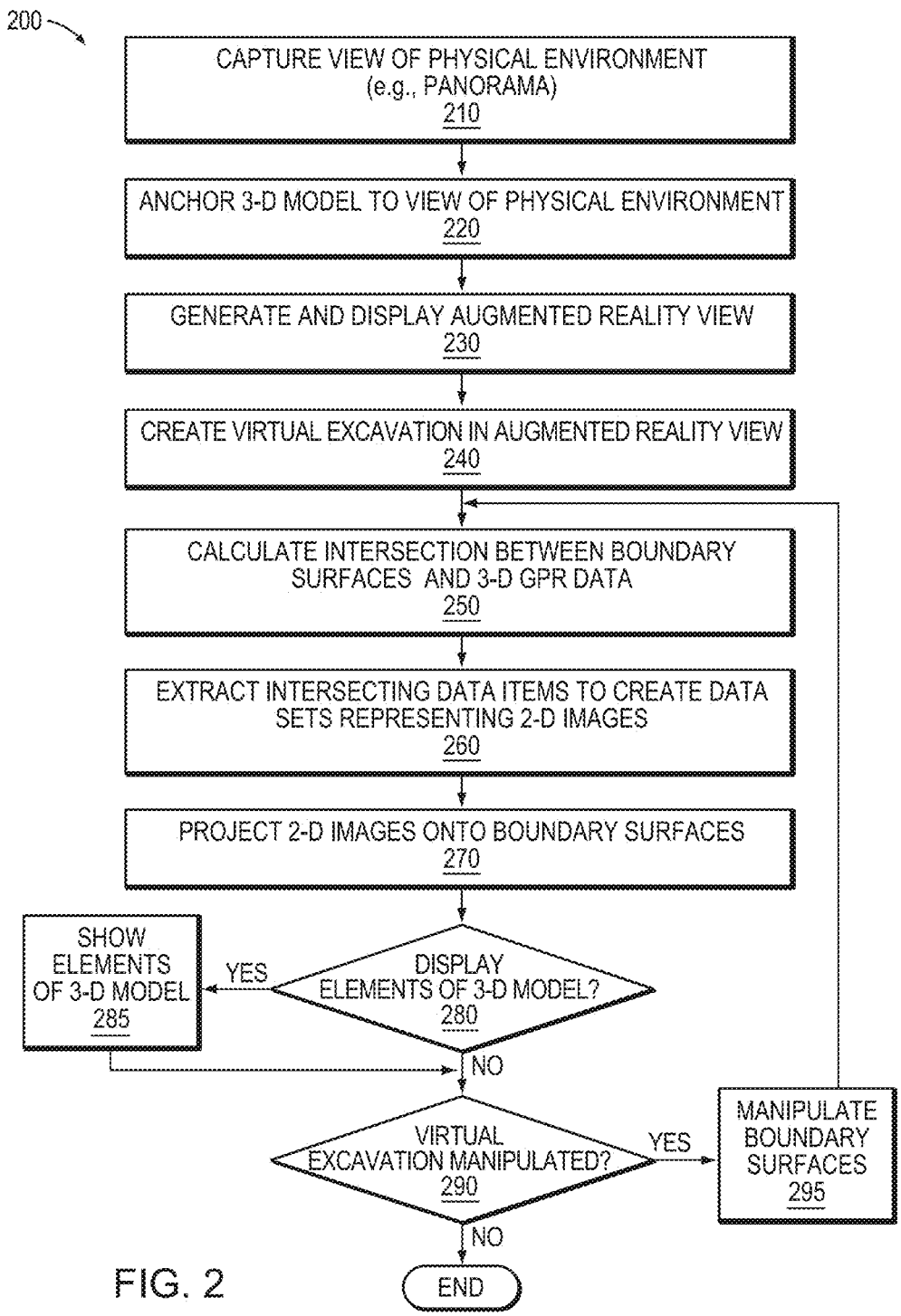
FIG. 2 is a flow diagram of an example sequence of steps that may be used to generate an augmented reality view that includes a virtual excavation showing 3-D GPR data.

FIG. 2 is a flow diagram of an example sequence of steps that may be used to generate an augmented reality view that includes a virtual excavation showing 3-D GPR data. At step 210, a view of the physical environment (e.g., a planar or panoramic view) is captured. The view of the physical environment may be a static view (e.g., a still image captured at a moment in time) or a dynamic view (e.g., full motion video continually being captured). Such view may be captured in a number of different manners. In one technique, for instance where the view of the physical environment is a static view, a camera may be stabilized (for example by a tripod) at a selected position in the physical environment and a view captured from a single position. In other techniques, for instance where the view of the physical environment is a dynamic view, the view may be captured using a camera that is not constrained to a single position, and that moves about through the physical environment. At step 220, a 3-D model 144 corresponding to view of the physical environment is anchored to the view of the physical environment, such that correspondence is defined between portions of (e.g., points in) the 3-D model and portions of (e.g., points in) the view of the physical environment. Due to such correspondence, each portion of (e.g., point in) the view of the physical environment corresponds to a position within 3-D space of the 3-D model, and may be associated with coordinates of a coordinates system for this 3-D space. The anchoring may be performed using any of a number of techniques. In one technique, a user sequentially selects a certain minimum number of points in the 3-D model and corresponding points in the view of the physical environment, and indicates they correspond using an input device 175. In another technique, a special initialization user interface is utilized, which includes a top-down view that depicts the 3-D model and the view of the physical environment from above, and a first-person view that depicts the 3-D model and view of the physical environment from a viewpoint immersed within the scene. The user manipulates the position of the 3-D model using this interface until alignment is achieved. Details of such a technique may be found in U.S. patent application Ser. No. 13/364,846 by Stéphane Cote et al., filed on Feb. 2, 2012 for a "Technique for Providing an Initial Pose for a 3-D Model", the contents of which are incorporated by reference herein. In still other techniques, the anchoring may be performed in a fully automated manner by the augmented reality application 140.

At step 230, the augmented reality application 140 generates an augmented reality view of the physical environment and displays it in a user-interface. Elements of the 3-D model 144 may, at least initially, be hidden in the augmented reality view, such that what is shown appears quite similar to the original view of the physical environment. At step 240, the augmented reality application creates a virtual excavation in the augmented reality view. Step 240 may be triggered in response to user input on an input device 175. The virtual excavation operates as a virtual "hole" in material (e.g., in the ground) having a bottom boundary surface and side boundary surfaces, while being open to the top. The boundary surfaces may be defined by coordinates in the 3-D space of the 3-D model. In one implementation, the virtual excavation may be rectangular, and thereby have four side boundary surfaces, and a bottom boundary surface, defined by coordinates in the 3-D space of the 3-D model.

At step 250 the augmented reality application 140 calculates an intersection between the boundary surfaces of the virtual excavation and the 3-D GPR data 146. At step 260, data items of the 3-D GPR data 146 whose positions intersects the boundary surfaces of the virtual excavation are extracted to create a number of data sets, each data set corresponding to a respective boundary surface. The data sets, when visualized, produce 2-D images.

Figure 3:
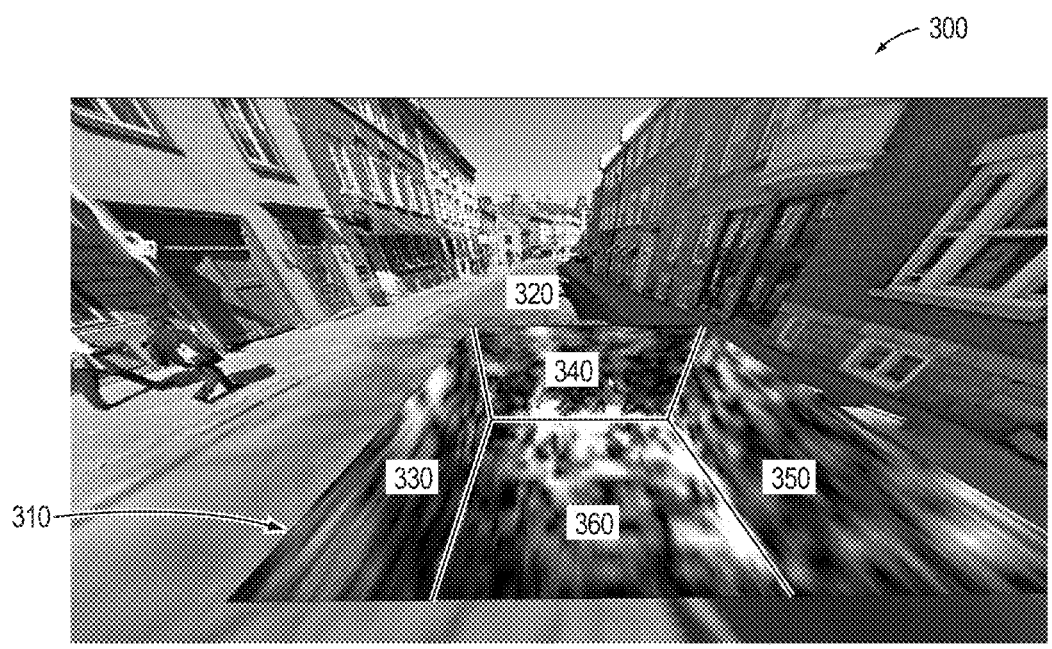
FIG. 3 is an example augmented reality view including a virtual excavation.

At step 270, the augmented reality application 140 projects the 2-D images onto the related boundary surface of the virtual excavation, thereby completing the augmented reality view. FIG. 3 is an example augmented reality view 300 including a virtual excavation 310. In this example, the augmented reality view depicts a physical street 320, and the virtual excavation 310 extends through the pavement of the street into the soil below. The virtual excavation 310 has side boundary surfaces 330, 340, 350, and a bottom boundary surface 360, on which 2-D images generated from 3-D GPR data collected from the surface of the street 320 are projected. The 2-D images show variations in material, for example, using different shading or colors, and thereby provide an indication of subsurface features (e.g., pipes, rocks, voids, etc.). For example, in FIG. 3, the white shading in the 2-D images may indicate the presence of subsurface features. The overall effect resembles a physical excavation in the street 320, with subsurface features visible on the side boundary surfaces 330, 340, 350 and bottom boundary surface 360, similar to as they would appear in a physical excavation in the street 320.

At step 280 it is determined if elements of the 3-D model are to be displayed in the augmented reality view. If so, at step 285, the augmented reality application 140 renders and shows elements of the 3-D model, for example, within the interior of the virtual excavation. Execution then proceeds to step 290. In step 280, if elements of the 3-D model are not to be displayed in the augmented reality view, then execution may simply proceed to step 290.

At step 290, it is determined whether the virtual excavation is to be manipulated, (e.g., moved, rotated, scaled, have its depth changed, etc.), for example, based on user input on an input device 175. If so, execution proceeds to step 295, where the augmented reality application 140, manipulates the boundary surfaces of the virtual excavation, for example by changing the coordinates that define the boundary surfaces of the virtual excavation. Execution then loops back, and steps 250-280 are repeated to recalculate the intersection between the boundary surfaces and the 3-D GPR data 146, re-extract data items that intersect, form new data sets, and project new 2-D images generated from these new data sets onto the new boundary surfaces.

Figure 4:
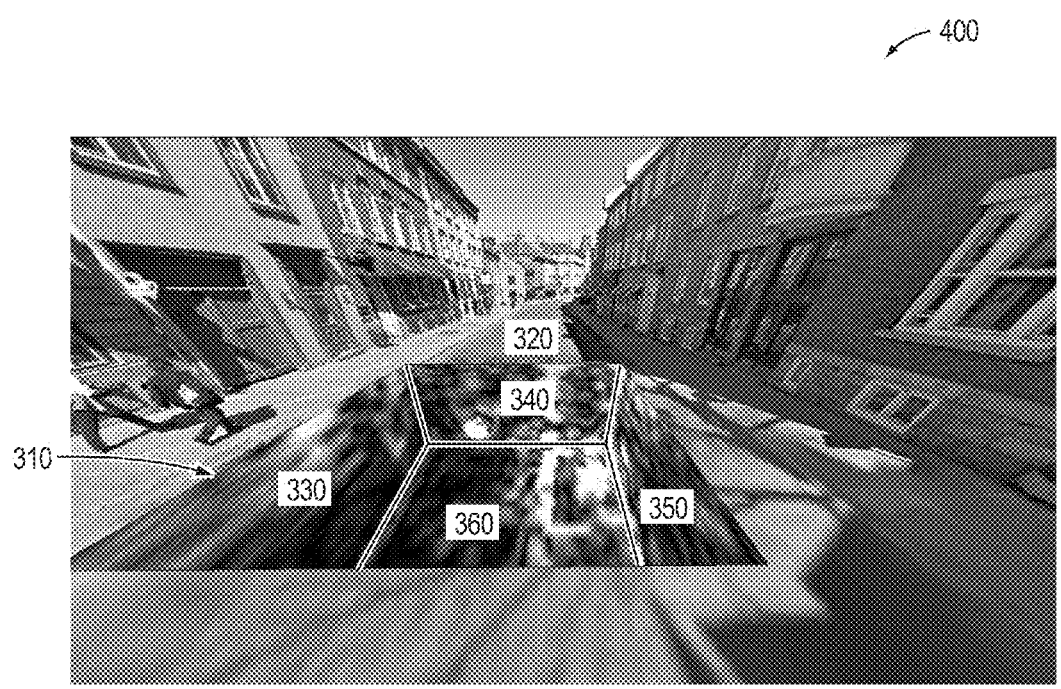
FIG. 4 is an example augmented reality view showing the virtual excavation moved to a different position than shown in FIG. 3.
Figure 5:
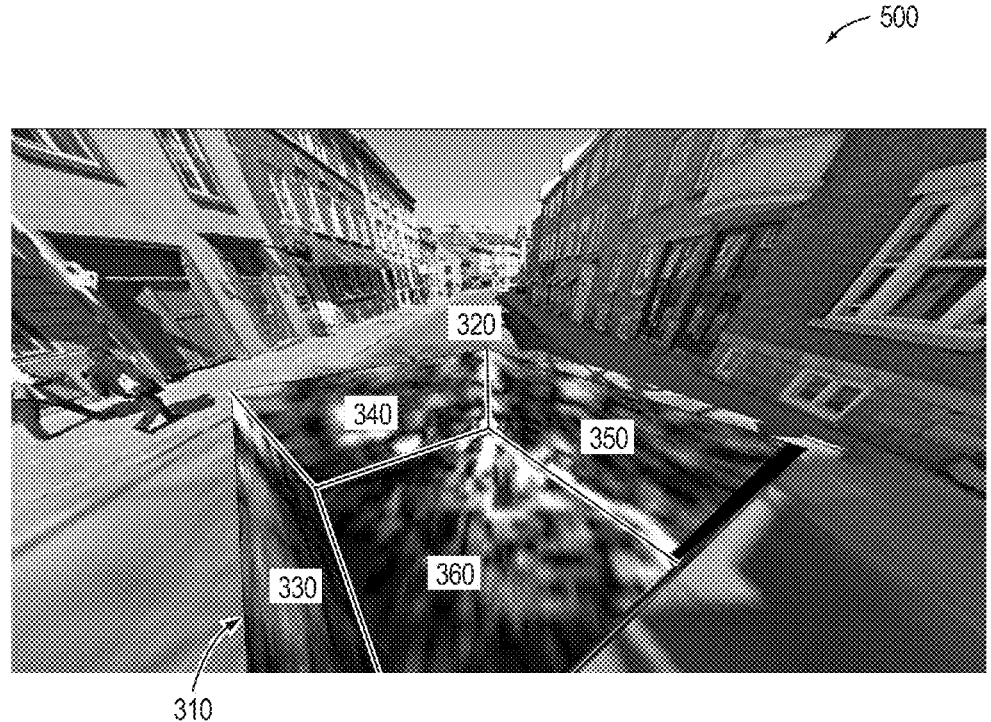
FIG. 5 is an example augmented reality view showing the virtual excavation rotated about its center to a different orientation than shown in FIG. 3.
Figure 6:
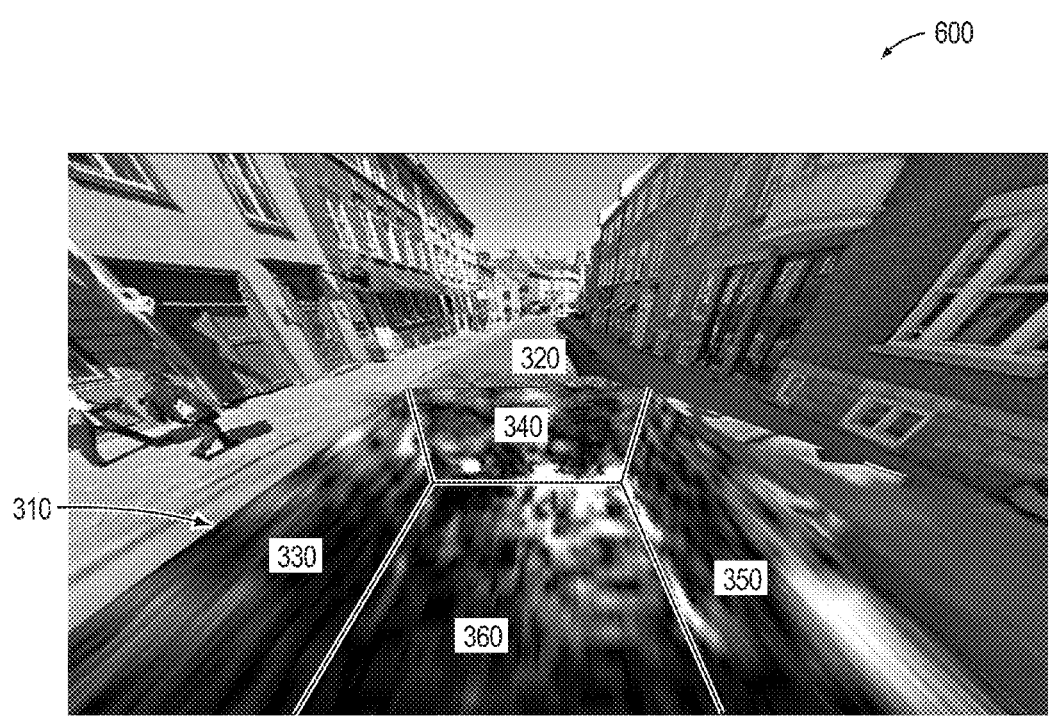
FIG. 6 is an example augmented reality view showing the virtual excavation scaled to be larger than its original size in FIG. 3.
Figure 7:
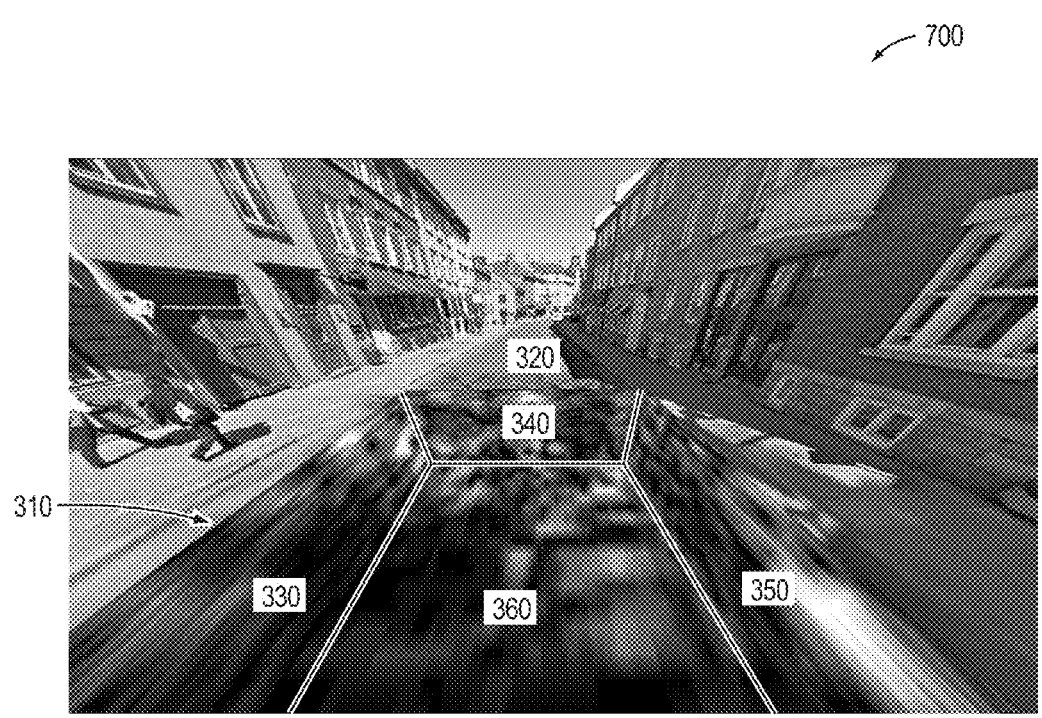
FIG. 7 is an example augmented reality view showing the depth of the virtual excavation changed to have a second depth.
Figure 8:
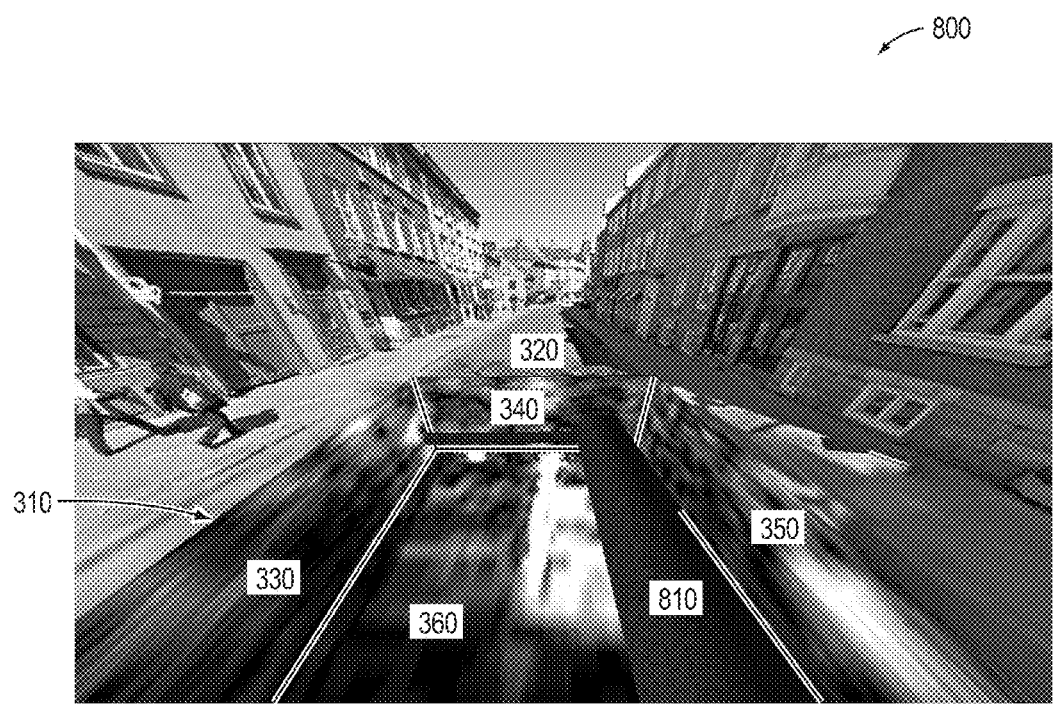
FIG. 8 is an example augmented reality view showing elements of a 3-D model, rendered and disposed within the virtual excavation.

Examples of the effects of the operations in FIG. 2 are provided in FIGS. 4-8. FIG. 4 is an example augmented reality view 400 showing the virtual excavation 310 moved to a different position than shown in FIG. 3. Alternatively, the manipulation may be a rotation. FIG. 5 is an example augmented reality view 600 showing the virtual excavation 310 rotated about its center to a different orientation than shown in FIG. 3. Further, the manipulation may be scaling. FIG. 6 is an example augmented reality view 600 showing the virtual excavation 310 scaled to be larger than its original size in FIG. 3. Still differently, the manipulation may be a change in depth. In FIG. 6, the bottom boundary 360 of the virtual excavation 310 is located at a first depth. FIG. 7 is an example augmented reality view 700 showing the depth of the virtual excavation changed to have a second depth. As be seen, the second depth is shallower than the first depth. FIG. 8 is an example augmented reality view 800 showing elements 810 of the 3-D model, rendered and shown within the virtual excavation 310. In this example, the elements represent pipes of a water distribution system. The rendered elements 810 may complement the 2-D images from the GPR data projected onto the boundary surface 330-360 of the virtual excavation, and allow the user to see relationships between the information in the 3-D model and subsurface features detected by GPR. While the above description discusses example techniques for generating an augmented reality view that displays 3-D GPR data on boundary surfaces of a virtual excavation, it should be understood that a number of modifications and/or additions may be made without departing from the disclosure's intended spirit and scope. While the specific examples above involve virtual excavations directed downward, where there is a bottom boundary surface but the top of the excavation is open, it should be understood that virtual excavations may be differently oriented, projecting in different directions, and having different open faces. Further, while the specific examples above involve virtual excavations in the ground, it should be understood that the virtual excavations may alternatively be in material located above ground, for example in walls, ceilings, supports, etc. Further, while the specific examples above involve GPR and GPR data, it should be understood that the techniques are equally applicable to other type of data descriptive of subsurface features collected by other technologies, such as wall-penetrating radar, resistivity imaging, seismic imaging, electromagnetic conductivity detection, as well as a variety of other technologies. Furthermore, it should be understood that the above described techniques may be implemented in software, in hardware, or a combination thereof. A software implementation may include executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method, comprising:
    displaying an augmented reality view on a display screen of an electronic device;
    creating a virtual excavation in a surface shown in the augmented reality view, the virtual excavation having a plurality of boundary surfaces that are defined by positions in three-dimensional (3-D) space of a 3-D model;
    calculating, by the electronic device, an intersection of positions of the plurality of boundary surfaces of the virtual excavation in the 3-D space of the 3-D model and 3-D ground penetrating radar (GPR) data that has been indexed in the 3-D space of the 3-D model;
    extracting, by the electronic device, data items of the 3-D GPR data that intersect the plurality of boundary surfaces of the virtual excavation to create a plurality of data sets, each data set corresponding to a respective one of the boundary surfaces of the virtual excavation; and
    for each data set, projecting a two-dimensional (2-D) image based on the extracted 3-D GPR data items of the data set onto the corresponding boundary surface of the virtual excavation in the augmented reality view, the 2-D image including colors or shading to show subsurface features determined from the extracted 3-D GPR data items.

2. The method of claim 1, wherein the 3-D model is a 3-D model of the physical environment, and the augmented reality view is based on a view of a physical environment captured by a camera and the 3-D model of the physical environment.

3. The method of claim 2, further comprising:
    anchoring the 3-D model of the physical environment to the view of the physical environment, such that each portion of the view of physical environment corresponds to a position within 3-D space of the 3-D model of the physical environment.

4. The method of claim 2, further comprising:
    showing one or more elements of the 3-D model of the physical environment within the virtual excavation in the augmented reality view.

5. The method of claim 2, wherein the view of the physical environment is a panoramic view.

6. The method of claim 1, further comprising:
    manipulating the plurality of boundary surfaces of the virtual excavation in response to user input.

7. The method of claim 6, wherein the manipulating comprises moving the virtual excavation within the augmented reality view.

8. The method of claim 6, wherein the manipulating comprises scaling the virtual excavation within the augmented reality view.

9. The method of claim 6, wherein the manipulating comprises changing a depth of the virtual excavation within the augmented reality view.

10. The method of claim 1, wherein the surface is ground.

11. An apparatus, comprising:
    a display screen;
    a processor; and
    a memory coupled to the processor and configured to store instructions for an augmented reality application that are executable on the processor, the instructions for the augmented reality application, when executed, operable to:
        display an augmented reality view on the display screen,
        create a virtual excavation in a surface shown in the augmented reality view, the virtual excavation having a plurality of boundary surfaces that are defined by positions in three-dimensional (3-D) space of a 3-D model,
        calculate an intersection of positions of the plurality of boundary surfaces of the virtual excavation in the 3-D space of the 3-D model and three-dimensional (3-D) ground penetrating radar (GPR) data that has been indexed in the 3-D space of the 3-D model,
        extract data items of the 3-D GPR data that intersect the plurality of boundary surfaces of the virtual excavation to create a plurality of data sets, each data set corresponding to a respective one of the boundary surfaces of the virtual excavation, and
        for each data set, project a two-dimensional (2-D) image based on the extracted 3-D GPR data items of the data set onto the corresponding boundary surface of the virtual excavation in the augmented reality view, the 2-D image including colors or shading to show subsurface features from the extracted 3-D GPR data items.

12. The apparatus of claim 11, wherein the 3-D model is a 3-D model of the physical environment, and the augmented reality view is based on a view of a physical environment captured by a camera and the 3-D model of the physical environment.

13. The apparatus of claim 12, wherein the instructions for the augmented reality application, when executed, are further operable to:
anchor the 3-D model of the physical environment to the view of the physical environment, such that each portion of the view of physical environment corresponds to a position within 3-D space of the 3-D model of the physical environment.

14. A non-transitory computer-readable medium that includes instructions executable on a processor, the instructions, when executed, operable to:
display an augmented reality view;
create a virtual excavation in a surface shown in the augmented reality view, the virtual excavation having a plurality of boundary surfaces that are defined by positions in three-dimensional (3-D) space of a 3-D model;
calculate an intersection of positions of the plurality of boundary surfaces of the virtual excavation in the 3-D space of the 3-D model and penetrating radar data descriptive of subsurface features that has been indexed in the 3-D space of the 3-D model;
extract data items of the penetrating radar data descriptive of subsurface features that intersect the plurality of boundary surfaces of the virtual excavation to create data sets, each data set corresponding to a respective one of the boundary surfaces of the virtual excavation; and
for each data set, project an image based on the extracted penetrating radar data items of the data set onto the corresponding boundary surface of the virtual excavation in the augmented reality view, the image including colors or shading to show one or more subsurface features determined from the extracted penetrating radar data items.

15. The non-transitory computer-readable medium of claim 14, wherein the 3-D model is a 3-D model of the physical environment, and the augmented reality view is based on a view of a physical environment captured by a camera and the 3-D model of the physical environment.

16. The non-transitory computer-readable medium of claim 15, wherein the instructions, when executed, are further operable to:
show one or more elements of the 3-D model of the physical environment within the virtual excavation in the augmented reality view.

17. The non-transitory computer-readable medium of claim 15, wherein the instructions, when executed, are further operable to:
manipulate the plurality of boundary surfaces of the virtual excavation in response to user input.

18. The non-transitory computer-readable medium of claim 15, wherein the surface is ground.

19. The method of claim 1, wherein the virtual excavation has a bottom boundary surface and side boundary surfaces, while being open to the top, and the plurality of boundary surfaces includes at least the side boundary surfaces.

20. The method of claim 19, wherein the plurality of boundary surfaces further include the bottom boundary surface.

* * * * *

UNITED STATES PATENT AND TRADEMARK OFFICE
CERTIFICATE OF CORRECTION

PATENT NO. : 9,715,008 B1
APPLICATION NO. : 13/847909
DATED : July 25, 2017
INVENTOR(S) : Stéphane Côté et al.

Page 1 of 1

It is certified that error appears in the above-identified patent and that said Letters Patent is hereby corrected as shown below:

In the Specification

Column 3, Line 11 reads:
3D model may be disco played in the augmented reality
Should read:
3-D model may be displayed in the augmented reality Signed and Sealed this
Twenty-third Day of October, 2018

Andrei Iancu
*Director of the United States Patent and Trademark Office*